UNITED STATES PATENT OFFICE.

CARL BOSCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

PRODUCING AMMONIUM SALTS.

990,192.     Specification of Letters Patent.     Patented Apr. 18, 1911.

No Drawing.     Application filed March 26, 1908. Serial No. 423,450.

*To all whom it may concern:*

Be it known that I, CARL BOSCH, doctor of philosophy and chemist, subject of the King of Prussia, residing at Ludwigshafen-on-the-Rhine, Germany, have invented new and useful Improvements in Producing Ammonium Salts, of which the following is a specification.

My invention relates to the production of ammonium salts from titanium nitrids, under which term I include both those compounds which only contain titanium and nitrogen and also the so-called titanium cyanonitrid, which can easily be obtained, for instance, by heating a mixture of titanic acid and carbon in the presence of nitrogen (Deville and Wöhler, *Annalen der Chemie*, Vol. 103, page 230 *et seq.*). For the purposes of this invention, titanium nitrid and titanium cyanonitrid are equivalents.

Friedel and Guerin (*Comptes Rendus*, 82, p. 974) have stated that a titanium nitrid ($Ti_2N_2$) on being boiled with concentrated sulfuric acid gives rise to ammonia and titanic acid. It is also stated in the literature on the subject that titanium cyanonitrid is unattacked by boiling concentrated sulfuric acid and that by melting it at a red heat with potassium bisulfate (*Annalen der Chemie*, 73, p. 38) the nitrogen is evolved as such, and it is also stated (Dammer, "*Handbuch d. Anorg. Chemie*," II. part 1, p. 597) to be soluble in a mixture of nitric acid and hydrofluoric acid. In this case also nitrogen is set free.

In the specifications of the applications for Letters Patent Serial No. 418,848, filed March 2, 1908, and Serial No. 423,451, filed March 26, 1908, I have described the production of ammonia by treating titanium cyanonitrid and the titanium nitrids with an oxidizing agent. I have now discovered that the titanium nitrids can be made to yield ammonia by heating them with an acid, under which term I include a salt which splits off acid, while maintaining the temperature so low that no oxidation of the titanium compound takes place. The reaction may be carried out in the presence of water, or steam. If concentrated sulfuric acid be employed according to my present invention, the temperature used may not exceed about 170° C., as otherwise the sulfuric acid acts as an oxidizing agent. When other acids are employed, the temperature used may be higher, but in each case, as aforesaid, it must be below that temperature at which the acid being used is able to exert an oxidizing influence on the titanium compound. The titanium compound is obtained in the form of a salt of one of the lower oxids of titanium and can easily be reconverted into titanium nitrid or titanium cyanonitrid.

The following examples will serve to illustrate further the nature of my invention and the method of carrying it into practical effect, but my invention is not confined to these examples. The parts are by weight.

Example 1: Stir finely divided titanium cyanonitrid with concentrated sulfuric acid at a temperature of 150° C. until decomposition is complete. Dilute with water and blow air through the boiling solution until the titanium has all separated out in the form of titanic acid, and filter this off. The filtrate contains ammonium sulfate in solution. If desired, the ammonia can be obtained as gas in the well known way.

Example 2: Boil titanium nitrid with from 15 to 20 times its weight of 30 per cent. sulfuric acid while excluding air. A violet solution containing ammonium sulfate is obtained from which ammonia can be isolated in any suitable manner. The reaction which takes place can be represented by the equation

$$Ti_2N_2 + 4H_2SO_4 = (NH_4)_2SO_4 + Ti_2(SO_4)_3.$$

Example 3: Heat finely divided titanium cyanonitrid with concentrated hydrochloric acid for 6 hours at 200° C., and under pressure. The resulting blue solution contains ammonium chlorid and can be worked up for ammonia.

Example 4: Heat titanium cyanonitrid with an aqueous solution of aluminium chlorid under pressure, at 200° C. The filtered solution can be worked up for ammonia.

Having now described my invention what I claim is:

1. The process of producing an ammonium salt by heating a titanium nitrid with an acid, while maintaining the temperature below that at which the acid used is able to exert an oxidizing influence on the titanium compound.

2. The process of producing ammonium sulfate by heating titanium nitrid with concentrated sulfuric acid at a temperature below 170° C.

In testimony whereof I have hereunto set my hand in the presence of two subscribing witnesses.

CARL BOSCH.

Witnesses:
J. ALEC. LLOYD,
JOS. H. LEUTE.